Oct. 24, 1950

F. I. SAMET 2,526,694

GRAPHIC PRIVACY SYSTEM

Filed Nov. 18, 1947

FRANK I. SAMET
*INVENTOR.*

BY Alfred W. Barber
ATTORNEY

Patented Oct. 24, 1950

2,526,694

UNITED STATES PATENT OFFICE 2,526,694

GRAPHIC PRIVACY SYSTEM

Frank I. Samet, New York, N. Y., assignor to Faximile, Inc., New York, N. Y., a corporation of Delaware Application November 18, 1947, Serial No. 786,691

3 Claims. (Cl. 35—4)

The present invention concerns timing devices and, in particular, timing devices adapted for use in facsimile graphic privacy systems.

The art of facsimile is concerned with the reproduction of graphic material at a distance, through the medium of electrical signals. The original copy to be reproduced is scanned by suitable means, such as a small spot of light reflected into a photoelectric cell from the surface of the material, and the resulting electrical signals in the photoelectric cell, due to density variations in the original copy, are amplified and utilized by transmission to some distant point to reproduce the original copy by a reversal of the scanning process. The reproduction or recording of the copy at the distant point may be by means of a recording point moved in synchronism with the scanning spot upon a suitably sensitized record sheet. The signals to be reproduced appearing as electrical currents, heat, or light, react upon the sensitized surface in accordance with the density variations of the original copy and thereby provide a reproduction or facsimile of the original copy.

It is sometimes desirable to provide means for secrecy in the transmission of facsimile signals. Military operations depending upon the transmission of maps by facsimile is an example of an important application of secret facsimile transmissions. One method by which secrecy may be obtained in facsimile systems is described in the Patent No. 2,437,255 of John V. L. Hogan et al., entitled "Graphic Privacy System." In the system described in this patent the graphic material of the original copy is reproduced photographically an area at a time and the areas are mixed according to a complex code. The original copy is attached to a drum and a predetermined area of the original copy is focussed upon a second drum by means of a suitable lens system. The drum holding the original copy is rotated continuously while the drum receiving the enciphered copy is rotated a step at a time. When an area to be reproduced, as determined by the coding system, is opposite a point on the drum receiving the reproduced copy, at which the reproduction is to be made, a stroboscopic light is flashed illuminating the area and causing the photographic transfer. The stroboscopic lamp is flashed through a complex series of circuits involving stepping switches and keyblocks and a timing device consisting of commutator segments carried by the original copy drum.

As the areas to be reproduced are made smaller and smaller in order to increase the degree of secrecy in the system, the accuracy in timing the flash of the stroboscopic lamp must be increased or over-lapping or under-lapping areas will be produced in the final copy.

The present invention concerns methods of and means for accurately timing the firing of the stroboscopic light.

One object of the present invention is to provide methods of and means for accurately timing the firing of a stroboscopic light in a facsimile secrecy system or the like.

Another object of the present invention is to provide for accurately timing the flash of the stroboscopic light while keeping the mechanism small and compact.

Another object of the present invention is to provide means for generating an accurately timed pulse for flashing a stroboscopic light.

These and other objects of the present invention will be apparent from the detailed description of the invention given in connection with the various figures of the drawing.

Figure 1:
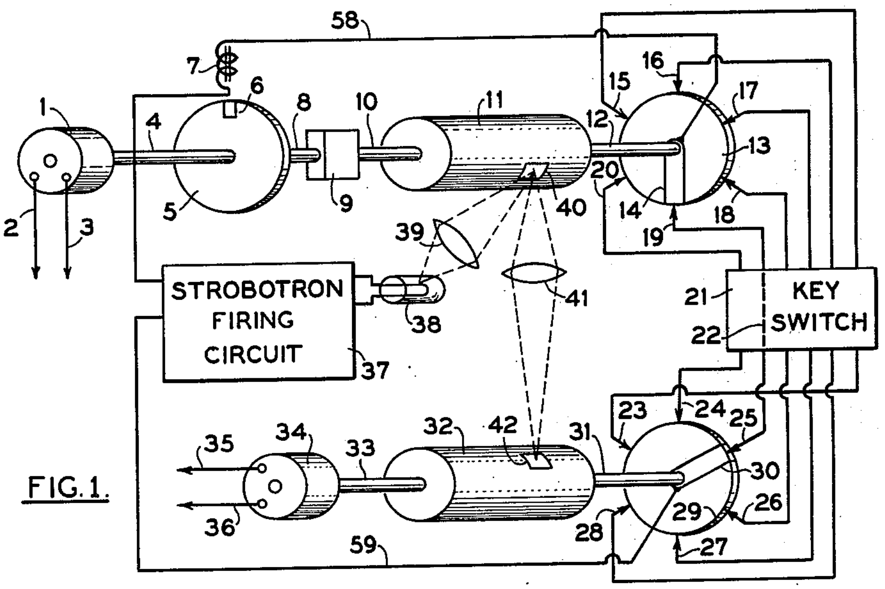
Fig. 1 shows one embodiment of the present invention in a facsimile secrecy system.

Fig. 1 shows a motor 1 receiving power over leads 2 and 3 and transmitting mechanical power over shaft 4 continued as shaft 8 to gear box 9 from which drum 11 is turned through shaft 10. Drum 11 carries the original copy to be enciphered. Switch 13 includes a contact arm 14 rotated by shaft 12 which is a continuation of the shaft 12 from drum 11. Switch 13 has a number of contacts, usually of the order of 50 or more, but for purposes of illustration and simplicity is shown to have only six contacts, that is contacts 15, 16, 17, 18, 19 and 20. The original copy attached to drum 11 is transferred photographically to drum 32 through the medium of the lens 41 which focuses an area 40 of the original copy onto an area 42 on the transfer drum 32. The transfer is effected by means of a stroboscopic lamp 38 focused on area 40 through lens 39 and flashed at an appropriate instant. Drum 11 is rotated continuously by motor 1 through gear box 9 while drum 32 is stepped one sixth of a revolution at the completion of each revolution of drum 11 by means of step motor 34 through shaft 33. Step motor 34 receives an impulse over wires 35 and 36 at the end of each revolution of drum 11. Details of this and other portions of this system are set forth in the above mentioned patent application. Drum 32 has a shaft extension 31 operating movable contact 30 of switch 29. Switch 29 has a number of contacts corresponding to the number of contacts on switch 13 and in the case illustrated there are six contacts 23, 24, 25, 26, 27 and 28. Wires to the stationary contacts on switches 13 and 29 are interconnected through a key switch 21 one circuit being shown as dotted line 22 from contact 25 through contact 19. Thus upon each revolution of drum 11 one of the circuits of switch 13 is connected through key switch 21 to the contact being made by arm 30 on switch 29. The point at which this circuit is completed on the rotation of drum 11 determines the particular area 40 which is transferred from drum 11 to drum 32 for the particular position of drum 32. It has been found that depending on a commutator or switch contacts to complete the circuit just described to the strobotron firing circuit results in inaccuracies in the timing of the firing of the stroboscopic lamp 38, and, as was set forth in the above designated application, that by interposing a pulse generating circuit in series with these switches (as in leads 58 and 59 connected between arms 14 and 30 to the strobotron firing circuit 37) a more accurate timing of the stroboscopic lamp results. This impulse generator may be an electro magnetic coil 7 impulsed by a magnetic slug 6 in disc 5. If disc 5 were attached to shaft 10 and rotated at the same speed as drum 11, a slug would be required for each switch position or, in the case illustrated, six slugs in all. Such a disc would have to be of very large dimensions in order to generate a sharp accurately timed pulse when firing the stroboscopic lamp. It has been found that by rotating disc 5 at a high rate of speed the sharpness of the impulse and the accuracy of the timing may be greatly improved. This high speed operation of disc 5 is readily accomplished by attaching it to shaft 4 of motor 1. Since, in this illustrative example, six impulses must be generated for each revolution of drum 11, corresponding to the number of switch positions on switch 13, disc 5 (carrying only one slug 6) must be rotated six times as fast as drum 11. Thus a gear reduction in gear box 9 equal to the number of switch positions may be utilized. It will be appreciated that with large numbers of contacts on switch 13, say 50, the increased accuracy over a direct drive will be of the order of 50 times. Thus, in the case illustrated, for each revolution of drum 11 disc 5 will rotate six times generating 6 impulses but only one will be effective since only one circuit will be closed through switches 13 and 29 to the strobotron firing circuit 37. The accuracy of the timing of the firing of the stroboscopic lamp 38 will then depend upon the accuracy of the gearing in gear box 9 and the steepness of the wave front of the pulse generated in coil 7. It is preferred to design slug 6 and the core and polepiece of coil 7 so as to generate an extremely steep wave front.

Figure 2:
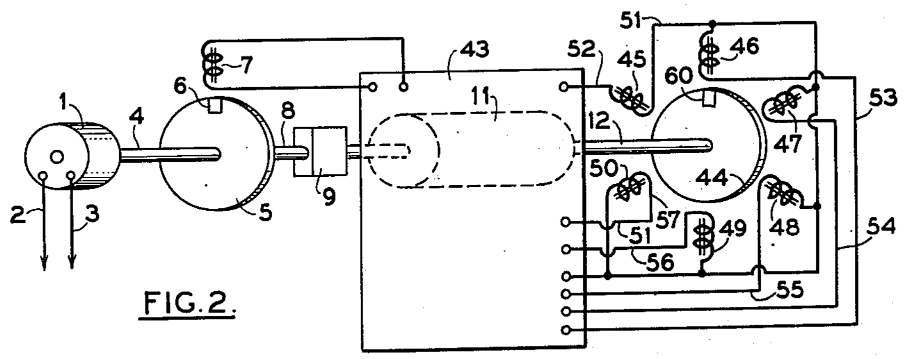
Fig. 2 shows a modified form of the embodiment of Fig. 1.
Figure 3:
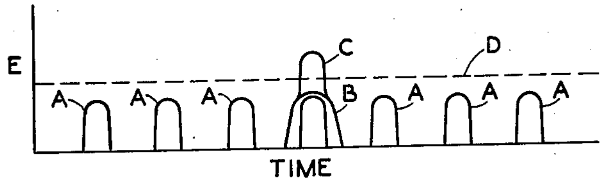
Fig. 3 shows a plot of voltage pulses illustrating the operation of the system shown in Fig. 2.

Fig. 2 shows a somewhat modified form of the invention employing similar components with disc 5, gear box 9 and drum 11. Details of other portions of the system are to be understood to be included in box 43 and would be similar to those shown in Fig. 1. Shaft 12 of drum 11 carries a disc 44 having a magnetic slug 60 in place of switch 13 shown in Fig. 1. Magnetic slug 60 generates pulses in six pick up coils 45, 46, 47, 48, 49 and 50 equally spaced around the periphery of 44. Leads from these pick up coils 51, 52, 53, 54, 55, 56 and 57 go to appropriate key switches in unit 43 corresponding to switches 21 and 29 of Fig. 1. Pick up coil 7 generating an impulse upon the passage of slug 6 and disc 5 is connected through the switches so that the impulse generated by slug 60 is superimposed at one point upon those generated by slug 6. As described above, key switch circuits only complete the circuit at an appropriate position of drum 11 and hence the impulses are superimposed only at one point in the revolution of drum 11. This principle is illustrated in Fig. 3 where pulses A, A, etc. represent the pulses generated by slug 6, D represents the critical firing voltage of strobotron lamp, B represents the impulse from one of the coils around disc 44 and C represents their sum. The strobotron is fired only when combined impulse C is produced exceeding the critical firing voltage D when pulses A and B are superimposed. Although the slope of pulse B produced by slug 60 may not be sufficient to provide accurate timing of the stroboscopic light, the firing depends almost entirely on the timing of pulse A which is superimposed from slug 6. As was described in connection with Fig. 1 the timing of pulses A is highly accurate due to the stepped-up speed of disc 5, and the steep wave front generated by 6.

While only a single embodiment and one modification of the present invention has been shown and described, many modifications will be apparent to those skilled in the art and within the spirit and scope of the present invention as particularly set forth in the appended claims.

What is claimed is:

1. In a device of the class described, the combination of, apparatus for transferring graphic material photographically from a subject copy to a sensitized receiving surface according to a predetermined pattern including a pulse responsive source of illumination, a plurality of rotatable contact devices for roughly determining the time of generation of a pulse to actuate said source of illumination, rotatable pulse generating means, and speed changing means connected between the two rotatable means to operate said pulse generating means at an angular velocity at least fifty times the angular velocity of said contact means to precisely time the occurrence of said pulse.

2. In a device of the class described, the combination of, a rotatable drum for carrying subject copy to be photographically transferred a small area at a time to a sensitized receiving surface, a pulse responsive source of illumination for intermittently illuminating the areas to be transferred, a multiple element commutator coupled to said drum to rotate therewith for at least partially determining predetermined time intervals for pulsing said illumination source, and a rotatable pulse generating device geared to said commutator by means of a step-up gearing means having a ratio equal to the number of elements of said commutator for generating a pulse to activate said source of illumination.

3. In a device of the class described, means for photographically transferring graphic material from a subject copy to a sensitized receiving surface a small area at a time including a high speed light source, a multiple element rotatable energizing device for partially energizing said light source, and a single element energizing device geared to the first said device by a step-up gearing means having a ratio equal to the number of elements in the first said device for triggering said light source at precisely determined intervals.

FRANK I. SAMET.

REFERENCES CITED

The following references are of record in the file of this patent:

UNITED STATES PATENTS

| Number | Name | Date |
|---|---|---|
| 2,172,330 | Bryce | Sept. 5, 1939 |
| 2,346,251 | Bryce | Apr. 11, 1944 |
| 2,437,255 | Hogan | Mar. 9, 1948 |